J. DUNSEITH & S. CRAWFORD.
Water-Heater for Stove-Pipes.
No. 207,855. Patented Sept. 10, 1878.
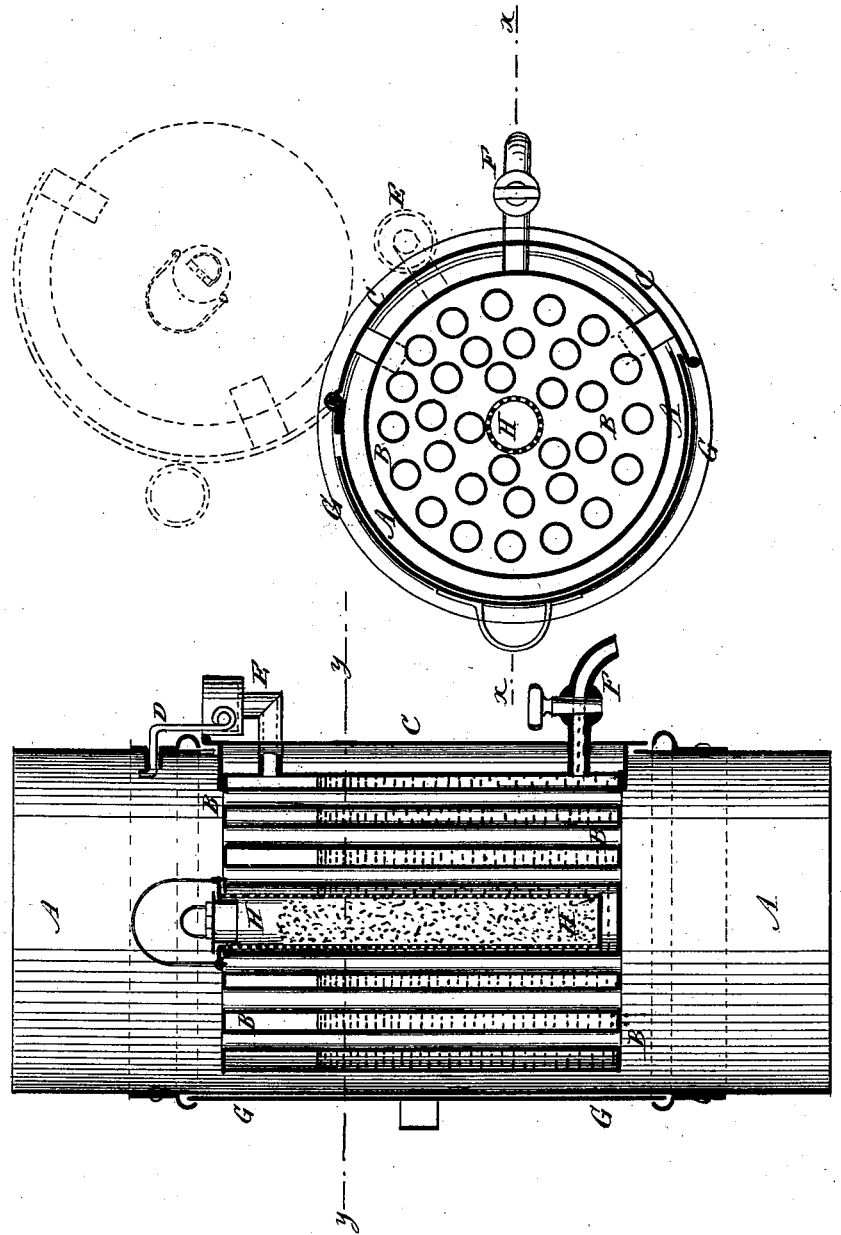
WITNESSES:
C. Neveux
C. Sedgwick
INVENTOR:
J. Dunseith
S. Crawford
BY Munn & Co
ATTORNEYS.

UNITED STATES PATENT OFFICE.

JAMES DUNSEITH AND SAMUEL CRAWFORD, OF NEW YORK, N. Y.

IMPROVEMENT IN WATER-HEATERS FOR STOVE-PIPES.

Specification forming part of Letters Patent No. 207,855, dated September 10, 1878; application filed March 26, 1878.

*To all whom it may concern:*

Be it known that we, JAMES DUNSEITH and SAMUEL CRAWFORD, of the city, county, and State of New York, have invented a new and useful Improvement in Water-Heating Attachment for Stove-Pipes, of which the following is a specification:

Figure 1 is a vertical section of our improved device, shown as applied to a length of stove-pipe, taken through the line $xx$, Fig. 2. Fig. 2 is a horizontal section of the same, taken through the line $yy$, Fig. 1.

Similar letters of reference indicate corresponding parts.

The object of this invention is to furnish an improved water-heating attachment for stove-pipes which shall be so constructed as not to interfere with the draft of the stove, while utilizing the heat that may be passing off through the pipe for heating water, making coffee, or other desired purposes, and which shall be simple in construction, convenient in use, and easily attached and detached, as required.

The invention consists in the combination or the tubular vessel provided with an inlet-pipe and a discharge-faucet with the hinged section of the notched length of stove-pipe.

A represents a length of stove-pipe having a section of any desired length, and of a breadth equal or nearly equal to half the circumference of the said pipe, cut from it.

B is a cylindrical vessel with closed ends, having tubes open at both ends passing longitudinally through it. The vessel B is made of a less diameter than the pipe A, so that when placed within the said pipe A a space may be left all around it for for the passage of the smoke.

The vessel B is connected at one side, by arms or other supports, with a section, C, of pipe, which is made a little larger than the opening in the said pipe A, and is hinged to the pipe A at one edge of the opening formed in it, so that by swinging the said section upon its hinges the vessel B may be swung into or out of the cavity of the pipe A, and so that when swung into the said cavity the free edge of the section C may overlap the pipe A at the side of its opening, and thus tightly close the said opening, where it may be secured in place by a button, D, or other suitable means. The hinges of the section C are so formed that the said section may be readily lifted off, if desired, for convenience in cleaning it.

The vessel B is provided near its upper end with an inlet-pipe, E, having an enlarged or funnel-shaped outer end, for convenience in pouring in water or other liquid. The vessel B is also provided near its lower end with a faucet, F, for convenience in drawing out its contents when desired.

The opening in the side of the stove-pipe may be closed when the vessel B is swung out or detached by a curved plate, G, sliding in guards attached to the stove-pipe A, as shown in Figs. 1 and 2, which plate, when the vessel B is in place, may be slid back to the other side of the said pipe A, as shown in Fig. 2. The vessel B may be provided with a water-gage to indicate the height at which the liquid stands within it.

If desired, the middle part of the vessel A may be cut away to receive a detachable vessel, H, which may be made with perforated sides, and which is designed to receive ground coffee or other substance to be steeped or cooked.

The vessel H may be made with closed sides, if desired, to keep its contents from contact with the liquid contents of the vessel B.

The vessel H is provided with a bail for convenience in removing and inserting it, and with a closely-fitting cover, as shown in Fig. 1.

If desired, a portion of the stove-pipe may be branched, and one of the vessels B connected with each of said branches, in which case the said branches should be provided with dampers so arranged that the products of combustion may be sent through either or both branches, as may be desired.

Having thus described our invention, we claim as new and desire to secure by Letters Patent—

The combination of the tubular vessel B, provided with the inlet-pipe E and a discharge-faucet, F, with the hinged section C of the notched length of stove-pipe A, substantially as herein shown and described.

JAMES DUNSEITH.
SAMUEL CRAWFORD.

Witnesses:
JAMES T. GRAHAM,
C. SEDGWICK.